(12) United States Patent
Muyldermans et al.

(10) Patent No.: US 12,503,585 B2
(45) Date of Patent: Dec. 23, 2025

(54) SILANE FUNCTIONALIZED STYRENIC BLOCK COPOLYMER

(71) Applicant: Kraton Polymers LLC, Houston, TX (US)

(72) Inventors: Xavier D.D.J. Muyldermans, Mont-Saint-Guibert (BE); Yongkui Sun, Shanghai (CN)

(73) Assignee: Kraton Corporation, The Woodlands, TX (US)

( * ) Notice: Subject to any disclaimer, the term of this patent is extended or adjusted under 35 U.S.C. 154(b) by 920 days.

(21) Appl. No.: 17/655,580

(22) Filed: Mar. 21, 2022

(65) Prior Publication Data
US 2022/0298351 A1    Sep. 22, 2022

Related U.S. Application Data

(60) Provisional application No. 63/200,672, filed on Mar. 22, 2021.

(51) Int. Cl.
*C08L 53/02* (2006.01)
*C08L 23/10* (2006.01)

(52) U.S. Cl.
CPC ............ *C08L 53/025* (2013.01); *C08L 23/10* (2013.01); *C08L 2205/035* (2013.01)

(58) Field of Classification Search
CPC ... C08L 53/025; C08L 23/10; C08L 2205/035
See application file for complete search history.

(56) References Cited

U.S. PATENT DOCUMENTS

| | | | |
|---|---|---|---|
| 4,783,504 A | 11/1988 | David et al. | |
| 4,822,857 A | 4/1989 | Gorman et al. | |
| 6,310,138 B1 * | 10/2001 | Yonezawa | C08F 297/04 525/88 |
| 7,449,518 B2 * | 11/2008 | Bening | C08F 297/04 525/271 |
| 10,189,933 B2 | 1/2019 | Besser et al. | |
| 10,304,584 B2 | 5/2019 | Matsumura et al. | |
| 2013/0244367 A1 | 9/2013 | Kohara et al. | |
| 2017/0369656 A1 * | 12/2017 | Kim | C08K 5/134 |

OTHER PUBLICATIONS

Data Sheet for Kraton G1652 (Year: 2023).*
Chantawansri Tanya, et al., "Phase Behavior of SEBS Triblock Copolymer Gels", Journal Of Polymer Science Part B: Polymer Physics, Oct. 11, 2011, 1479-1491.

* cited by examiner

*Primary Examiner* — Angela C Scott

(57) ABSTRACT

A silane functionalized block copolymer (SiHSBC) is disclosed comprising: 80 to 99.90 wt. % of a hydrogenated styrenic block copolymer (HSBC) and 0.1 to 20 wt. % of a silane, based on the total weight of the SiHSBC. The HSBC is obtained by hydrogenation of a styrenic block copolymer (SBC) comprising at least one polymer block A derived from a vinyl aromatic monomer, and at least one polymer block B derived from a conjugated diene monomer. The polymer block B has greater than 80 wt. % of a polymerized 1,3-butadiene monomer, based on the total weight of the polymerized conjugated diene monomer in the polymer block B. The SiHSBC as well as thermoplastic elastomer composition containing the SiHSBC show improved adhesion to polar and non-polar substrates without the need of an adhesive layer or primer layer.

18 Claims, No Drawings

SILANE FUNCTIONALIZED STYRENIC BLOCK COPOLYMER

RELATED APPLICATIONS

This application claims benefit to U.S. provisional application No. 63/200,672, filed on Mar. 22, 2021, which is hereby incorporated herein by reference.

FIELD

The disclosure relates to silane functionalized styrenic block copolymers, compositions, and methods of preparation thereof.

BACKGROUND

Substrate materials based on glass, ceramics, metals possess high heat resistance, better mechanical properties, and have high durability which make them useful in electrical appliances, electronic parts, automotive parts, solar panels, and in many other applications. In some applications, these materials are adhered to or made into composite with thermoplastic elastomers. Due to the excellent flexibility of thermoplastic elastomers and ease of processing, such materials are suitable for manufacturing structural members, absorbing shock, protection from damages, and sealing. However, due to the poor polarity of the thermoplastic elastomer, e.g., styrene based thermoplastic elastomer, the adhesive strength of such elastomer with a polar substrate is not sufficient for some end-use application.

To improve the adhesive strength of the thermoplastic elastomer with substrates, including polar and non-polar, the use of an adhesion promoter/primer has been attempted. Another commonly known approach for obtaining better adhesion is a surface treatment of the substrate prior to apply the thermoplastic elastomer. Silane functionalized block copolymers provide better adhesion to the substrate but may impact other properties, e.g., flexibility, elasticity, processability, storage stability, process stability, transparency, mechanical properties etc.

Therefore, there is a need of an improved silane functionalized block copolymer, which provides increased adhesion to substrates without impacting other properties.

SUMMARY

In a first aspect, the disclosure relates to a silane functionalized block copolymer (SiHSBC) comprising, consisting essentially of, or consists of (a) 80 to 99.90 wt. % of a hydrogenated styrenic block copolymer (HSBC); and (b) 0.1 to 20 wt. % of a silane, based on the total wt. of the silane functionalized block copolymer. The silane has a general formula (I) of RR'$_n$SiX$_{3-n}$, wherein R is an alkene or an alkyne group, R' is a H or an alkane group, X is an alkoxy group, and n=0, 1, or 2. The HSBC is obtained by hydrogenation of a styrenic block copolymer (SBC) comprising at least one polymer block A derived from a vinyl aromatic monomer, and at least one polymer block B derived from a conjugated diene monomer. The polymer block B has a hydrogenation level of greater than 95 mol %, based on the total mol of the polymerized conjugated diene monomer in the polymer block B; and an amount of the polymerized 1,3-butadiene monomer of greater than 80 wt. %, based on the total weight of the polymerized conjugated diene monomer in the polymer block B. The HSBC has a rubbery aliphatic methyl index (RAMI) of 18 to 38; and a polystyrene content (PSC) of 10 to 45 wt. %, based on the total weight of the hydrogenated styrenic block copolymer. The SiHSBC has a peel adhesion strength to a glass substrate of greater than 20 N/cm, measured according to ASTM F88.

In a second aspect, the HSBC has a solution viscosity at 25 wt. % in toluene at 25° C. of ≤1800 mPa·s.

In a third aspect, the polymer block A has a molecular weight ($M_p$) of 3 to 45 kg/mol, and the polymer block B has a molecular weight of ($M_p$) of 5 to 400 kg/mol.

In a fourth aspect, the HSBC has a molecular weight ($M_p$) of 40 to 500 kg/mol.

DETAILED DESCRIPTION

The following terms used in the specification have the following meanings:

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. A list of embodiments presented as "A, B, or C" is to be interpreted as including the embodiments, A only, B only, C only, "A or B," "A or C," "B or C," or "A, B, or C."

"Copolymer" refers to a polymer derived from more than one species of a monomer.

"Block copolymer" refers to a copolymer that comprises more than one species of a monomer, wherein the polymerized monomers are present in blocks. Each block is constituted of a set of monomer units different from the set of monomer of the connected surrounding blocks in the same block copolymer. Each block can be constituted of a homopolymer or a random copolymer.

"Plasticizer" refers to a compound that is added to a material to make it softer and more flexible, or to increase its plasticity, or to decrease its viscosity, or to decrease friction during its handling in the manufacturing process. Plasticizers are added to polymers such as plastics and rubber, either to facilitate the handling of the raw material during fabrication or to meet the demands of the end-use application.

"Order-disorder-transition temperature" or ODT refers to the temperature at which a block copolymer experience the transition between phase separated and non-phase separated states. ODT is defined as the temperature above which a zero shear viscosity can be measured by dynamic rheology. ODT temperatures can be measured using dynamic mechanical analysis (DMA), with temperature sweeps performed over various frequencies, wherein the ODT is identified as the temperature where complex viscosity begins to collapse to a single value at low frequencies.

"Coupling efficiency", or CE refers to values of the wt. % of the coupled polymer and the wt. % of the uncoupled polymer. The wt. % of the coupled polymer and the uncoupled polymer can be determined using a GPC and the output of the differential refractometer (RI) detector. The intensity of the signal at a specific elution volume is proportional to the amount of material detected at that elution volume. The area under the curve spanning the $M_W$ range corresponding to the coupled polymer is representative of wt. % of the coupled polymer, and likewise for the uncoupled polymer. The percentage CE is given by 100 times the wt. % of the coupled polymer/(wt. % of the coupled polymer+wt. % of the uncoupled polymer). The CE can also be measured by calculating data from the GPC, dividing the integrated areas below the GPC curve of all coupled polymers (including two-arm, three-arm, four-arm, etc. copolymers) by the same of the integrated areas below the GPC curve of both coupled and uncoupled polymers.

"Polystyrene content" or PSC of a block copolymer refers to the wt. % of the polymerized vinyl aromatic monomer, e.g., styrene in the block copolymer, calculated by dividing the sum of the molecular weight of all polymerized vinyl aromatic units by the total molecular weight of the block copolymer. PSC can be determined using any suitable methodology such as proton nuclear magnetic resonance (NMR).

"Rubbery Aliphatic Methyl Index" or RAMI in a polymer relates to a certain amount of a vinyl content of the polymerized 1,3-butadiene monomer in the polymer before hydrogenation. For example, the RAMI of 18-38 corresponds to the vinyl content of 48 to 100 mol % of the polymerized 1,3-butadiene monomer before hydrogenation, based on the total mol of the polymerized 1,3-butadiene monomer in the polymer, wherein all the polymerized 1,3-butadiene monomer are hydrogenated. RAMI can be computed as the ratio of the aliphatic protons (H) present in methyl groups of the hydrogenated polymerized conjugated diene monomer with respect to the total aliphatic protons present inside the rubbery units (e.g., the polymerized conjugated diene monomer such as polymerized 1,3-butadiene monomer, polymerized isoprene monomer, etc.), after correction to remove the contribution, into the aliphatic protons, from the protons of the polymerized vinyl aromatic monomers (e.g., polymerized styrene units). The aliphatic protons (H) can be measured using H-1 NMR spectroscopy. RAMI is expressed as:

RAMI=100×(Integral-2)/(Integral-1−(0.6*Integral-3))

wherein Integral-1 is determined by integrating the H-1 NMR spectrum from 0.6 ppm to 2.99 ppm; and Integral-2 is determined by integrating the H-1 NMR spectrum between 0.6 ppm and the minimum region of 0.8 ppm to 1.0 ppm. Integral-3 is determined by integrating the H-1 NMR HSBC spectrum from 6.2 ppm to 7.4 ppm.

"Molecular weight" or Mw refers to the polystyrene equivalent molecular weight in kg/mol of a polymer block or a block copolymer. Mw can be measured with the gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. Mw of polymers measured using the GPC so calibrated are polystyrene equivalent molecular weights or apparent molecular weights. Mw expressed herein is measured at the peak of the GPC trace and are commonly referred to as polystyrene equivalent "peak molecular weights," designated as Mr. If the polymer GPC displays several peaks, the chosen $M_p$ is the peak molecular weight of the major species (maximum in wt. %).

"Transparency" refers to a light transmission through an object. The transparency can be measured according to ASTM D-1003. This test method evaluates total light transmission and scattering of transparent object for a defined specimen thickness.

"Clarity" refers to a property of a material when light scatters upon passing through a flat material, it can produce an unclear or smoky effect. So, objects look hazy when viewed through the material.

"Thermoplastic block copolymer" refers to a block copolymer that can be processed at a higher temperature, and not purposely cross-linked before processing.

The disclosure relates to a silane functionalized block copolymer (SiHSBC) obtained by functionalizing or grafting 80-99.90 wt. % of a hydrogenated styrenic block copolymer (HSBC) with 0.1-20 wt. % of a silane compound, based on the total weight of the SiHSBC. The SiHSBC provides improved adhesion to polar and non-polar substrates, including glass, silicium wafer, ceramic, metal, plastic, reinforcing fibers etc., without the need of an adhesive or a primer layer.

Hydrogenated Styrenic Block Copolymer ("HSBC"): The HSBC is a thermoplastic block copolymer obtained by hydrogenation of a styrenic block copolymer (SBC).

In embodiments, the SBC is any of a linear or branched (multi-armed) block copolymer, comprising at least one polymer block A derived from a vinyl aromatic monomer, and at least one polymer block B derived from a conjugated diene monomer. The vinyl aromatic monomer can be introduced or copolymerized into the conjugated diene blocks by any order and in any distribution.

In embodiments, the SBC has a structure selected from the group of A-B, A-B-A, $(A-B)_nX$, A-B-B', $(A-B-B')_nX$, A-I-B-I-A, $(A-I-B)_n$-X and mixtures thereof, wherein n is a positive integer, X is residue of a coupling agent, and each I is predominantly a polymer block of polymerized isoprene monomer. In embodiments, the polymer blocks B and B' are same or different and are selected from the group of polybutadiene, poly(isoprene-r-butadiene), and poly(butadiene-r-styrene), wherein the -r- refers to a random copolymer, e.g., "poly(isoprene-r-butadiene)" means polyisoprene butadiene random copolymer.

In embodiments, the vinyl aromatic monomer is selected from the group of styrene, alpha-methyl styrene, methyl styrene, para-methyl styrene, ethyl styrene, propyl styrene, butyl styrene, tert-butyl styrene, dimethyl styrene, vinyl toluene, isomers of vinyl toluene, vinyl xylene, 1,1-vinyl biphenyl, vinyl naphthalene, vinyl anthracene, and mixtures thereof.

In embodiments, the conjugated diene monomer is selected from the group of 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof.

In embodiments, the polymer block B has the polymerized 1,3-butadiene monomer in an amount of >80, or >85, or >90, or >95, or up to 100 wt. %, based on the total weight of the polymerized conjugated diene monomer in the polymer block B.

In embodiments, in polymer block B, the polymerized 1,3-butadiene monomer has a vinyl content, before hydrogenation, of 48-95, or 50-90, or 55-85, or 60-85%, or >55, or <90% wt. %, based on the total weight of the polymerized 1,3-butadiene monomer.

In embodiments, the polymer block A derived from the polymerized vinyl aromatic monomer is essentially left non-hydrogenated and the polymer block B based on the polymerized conjugated diene monomer is hydrogenated. In embodiments, the polymer block A has a hydrogenation level of <30, or <20, or <10, or <5 mol %, based on the total mol of the polymerized vinyl aromatic monomer. In embodiments, the polymer block B has a hydrogenated level of >70, or >80, or >90, or >95, or >98, or >99 mol %, based on the total mol of the polymerized conjugated diene monomer in the polymer block B. The hydrogenation level refers to the % of original unsaturated bonds which become saturated upon hydrogenation, which can be determined using UV-VIS spectrophotometry and/or proton NMR and/or via ozonolysis titration.

In embodiments, the SBC is selected from but not limited to the group of styrene-butadiene (SB), styrene-butadiene-styrene (SBS), styrene-isoprene (SI), styrene-isoprene-styrene (SIS), styrene-isoprene/butadiene (S-I/B), styrene-isoprene/butadiene-styrene (SIBS), styrene-butadiene/styrene (S-B/S), styrene-butadiene/styrene-styrene (S-B/S-S), styrene-isoprene/styrene (S-I/S), styrene-isoprene/styrene-styrene (S-I/S-S), and mixtures thereof. In embodiments, the HSBC is selected from but not limited to the group of styrene-ethylene/butylene-styrene (SEBS), styrene-ethylene/butylene (SEB), styrene-ethylene/propylene-styrene (SEPS), styrene-ethylene/ethylene/propylene-styrene (SEEPS), styrene-ethylene/butylene/styrene-styrene (SE/B/SS), and mixtures thereof.

In embodiments, the polymer block A has a molecular weight ($M_p$) of 3-45, or 3.5-30, or 4-25, or 4.5-20, or 5-15, 5-10 kg/mol.

In embodiments, the polymer block B has a molecular weight ($M_p$) of 5-400, or 10-250, or 15-150, or 5-80, or 20-70 kg/mol.

In embodiments, the HSBC has a molecular weight ($M_p$) of 40-500, or 50-300, or 60-200, or 70-150, or 80-120 kg/mol.

In embodiments, the HSBC has a polystyrene content (PSC) of 8-45, or 10-40, or 12-35, or 14-30, 15-25 wt. %, based on the total weight of the HSBC.

In embodiments, the HSBC has an order-disorder-transition temperature (ODT) of <300° C., or 150-300° C., or 170-280° C., or 180-260° C., 190-250° C.

In embodiments, the HSBC has a rubbery aliphatic methyl index (RAMI) of 18-38, or 19-36, or 20-35, or 22-34, or 25-32.

In embodiments, the HSBC has a solution viscosity at 25 wt. % in toluene at 25° C. of ≤1800 mPa·s, or <1600 mPa·s, or <1400 mPa·s, or 50-1800 mPa·s, or 80-1200 mPa·s.

Silane for Functionalization/Grafting: The HSBC is functionalized with a silane of the general formula (I): $RR'_n\text{-}SiX_{3-n}$ wherein, R is an alkene or an alkyne group, R' is a H or an alkane group, X is an alkoxy group, and n=0, 1, or 2, to obtain a silane functionalized block copolymer (SiHSBC). In embodiments, R group is selected from the group of vinyl, allyl, butenyl, cyclohexenyl, cyclopentadienyl and the like. R' can be selected from H or alkane of $C_1$ to $C_{10}$, and X can be selected from the group of methoxy, ethoxy, butoxy, acyloxy, and the like.

Examples of suitable silanes include but are not limited to the group of vinyltrimethoxysilane (VTMOS), vinyltriethoxysilane (VTEOS), vinyltributoxysilane, vinyldimethoxyethoxysilane, vinyldimethoxybutoxysilane, vinyldiethoxybutoxysilane, allyltrimethoxysilane, allyltriethoxysilane, methacryloxypropyltrimethoxysilane, methacryloxypropyltriethoxysilane, dimethoxymethylsilane, diethoxymethylvinylsilane, p-styryltrimethoxysilane, p-styryltriethoxysilane, and mixture thereof.

The amount of the silane added to the HSBC varies based on the desired level of silane functionalization. Typically, this amount is in the range of 0.1-20, or 0.5-15, or 1-12, or 2-10 wt. %, based on the total weight of the HSBC and the silane.

A sufficient level of silane grafting onto the HSBC is needed to obtain the desired adhesion of the SiHSBC to a substrate, e.g., glass, silicium wafer, ceramic, metal, plastic, reinforcing fibers, etc. In embodiments, the level of the silane grafted onto the HSBC (degree of silane functionalization) is in the range of 0.1-20, or 0.2-15, or 0.5-12, or 0.1-10, or 0.2-5, or 0.2-4, based on the total weight of the SiHSBC.

When silane is added to HSBC for grafting, some can be left ungrafted. In embodiments, the amount of ungrafted silane is <40, or <30, or <20, or <10 wt. %, based on the total weight of the silane added for grafting onto the HSBC.

In embodiments, after grating the silane on to the HSBC to form the SiHSBC, the SiHSBC has a molecular weight ($M_p$) of 45-250, or 50-220, or 60-200 kg/mol.

Method for Making SiHSBC: First, a SBC containing at least a polymer block A and at least a polymer block B is prepared. The SBC can be prepared by known process in the art and disclosed and taught in U.S. Pat. No. 7,449,518, incorporated herein by reference. The SBC can be prepared by anionic polymerization or by sequential (or successive) polymerization. In embodiments, the polymerization of the monomers is performed by stepwise addition of the monomer to the solution containing an initiator, followed by coupling of the resulting sequential block copolymer chains with a coupling agent (if present).

In embodiments, the SBC is prepared via sequential polymerization, with the steps being similar to those used for anionic polymerizations, at a temperature of −30 to 150° C., or 10 to 100° C., or 30 to 90° C. It is carried out in an inert atmosphere, e.g., nitrogen, or under pressure within the range from about 0.5 to 65 bars. The polymerization generally requires <12 hrs., or from 5 min. to 5 hrs., depending on factors including temperature, concentration of monomer components, the molecular weight of the polymer, etc.

In embodiments with coupling, the coupling agent is selected from but not limited to the group of di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures thereof.

In embodiments, a silane based coupling agent is used in the preparation of a coupled SBC. In embodiments, the silane as the coupling agent and the silane compound as a functionalizing agent, is same or different.

In embodiments, any effective amount of the coupling agent is employed to obtain a desired coupling efficiency for the SBC. In embodiments, the SBC when coupled, has a coupling efficiency of >50%, or >60%, or >70%, or >80%, or >90%.

The SBC precursor is next hydrogenated to obtain the hydrogenated styrenic block copolymer (HSBC) using a hydrogenation process as disclosed in U.S. Pat. Nos. 3,670,054, and 3,700,633, incorporated herein by reference. Any hydrogenation process that is selective for the double bonds in the conjugated diene blocks, leaving the aromatic unsaturation in the polystyrene blocks substantially intact, can be used to prepare the HSBC.

In embodiments, the hydrogenation process employs a catalyst or catalyst precursor comprising a metal, e.g., nickel, titanium, or cobalt, and a suitable reducing agent such as an aluminum alkyl. Catalyst concentration is within the range from 10 to 500 ppm by wt. The hydrogenation of the SBC is controlled by using a relatively low hydrogenation temperatures in the range of 25-175° C., or 35-150° C., or 50-100° C. Typically, the hydrogenation is conducted for a period in the range of 5 min.-8 hours, or 30 min.-4 hours. The hydrogenation can be conducted in an autoclave at hydrogen pressure below about 3,000 psig, or 100-1500 psig, or 200-800 psig. After the hydrogenation is completed, the catalyst and the catalyst residue will be separated from the polymer.

Functionalizing/Grafting HSBC with Silane: In embodiments, the grafting of the silane onto the HSBC is carried out in a melt phase at a temperature of 160-240° C., or 170-230° C., or 180-220° C., via equipment known in the art, e.g., single-axis extruder or twin-axis extruder.

In embodiments, the SiHSBC is prepared via a solid phase method. The HSBC, the silane and an initiator are used for the solid phase silane functionalization in a reactor and at a temperature in the range between 40° C. and the melting temperature or the softening temperature of the HSBC. The SiHSBC with a degree of silane functionalization between 0.1-20 wt. %, is discharged at the end of the reactor.

Examples of initiators include organic peroxides, which can generate free radicals in the HSBC at a given reaction temperature resulting in a half-life of <6 minutes, or <1 minute at the functionalization temperature. In embodiment, the organic peroxide is selected from but not limited to the group of dicumyl peroxide (DCP) and 1,3-bis(tert-butylperoxyisopropyl) benzene, diacyl peroxides, alkyl peresters, percarbonates, dilauroylperoxide (DLPO), dibenzoyl peroxide (DBPO), tert-butyl peroxy-2-ethylhexanoate (TBPEH), tert-butyl peroxy-isobutyrate (TBPIB), 1,1-di-(tert-butylperoxy) cyclohexane (DTBPC), tert-butyl perbenzoate (TBPB), 2,5-dimethyl-2,5-di (tert-butylperoxy) hexane (DHBP), 2,5-dimethyl-2,5-di (tert-butylperoxy) hexyne-3 (DYBP), ditertbutyl peroxide (TBP), cumene hydroperoxide (CHP), tert-butyl hydroperoxide (TBHP), lauroyl peroxide, dipropionyl peroxide, p-menthane hydroperoxide, and mixture thereof.

In embodiments, organic peroxides forming free radicals with 1 minute half-life temperature in the range of 50-160° C., or 60-150° C., or 70-140° C. are added for grafting the silane onto the HSBC in a melt phase extrusion method, or at a reaction temperature between 50-200° C. in a solid phase functionalization method.

In embodiments, an initiator is added in an amount of 0.01-5, or 0.1-2, or 0.2-1 wt. %, based on the total weight of the HSBC and the silane.

In embodiments, the SiHSBC is cross-linked by treating with water or humid air. The water can be hot water/water vapor at a temperature of 40-90° C., or 65-85° C., or 70-80° C., for 0.5 hour-12 hours, or 1 hour-10 hours, or for up to 1 week or more.

Compositions Based on Silane Functionalized Block Copolymers: In embodiments, a thermoplastic polymer composition is prepared comprising 5-95 parts by weight of the SiHSBC, and 5-95 parts by weight of a thermoplastic elastomer compound (TPEC), based on the total weight of the thermoplastic polymer composition.

Thermoplastic elastomer compound (TPEC) refers to a composition comprising one or more thermoplastic elastomer (TPE) and based on 100 parts by weight of the TPE, 50-250 parts of a plasticizer, and 0-50 parts of at least an additive. In embodiments, the TPE is selected from the group consisting of polyolefins, TPE based on hydrogenated styrenic block copolymers (TPE-HSBCs), TPE based on styrenic block copolymer (TPE-SBC), thermoplastic copolyester or copolyester-ether (TPE-E), thermoplastic vulcanizates (TPE-V), thermoplastic polyurethanes (TPE-U), and mixtures thereof.

Alternatively, a thermoplastic polymer composition can be formulated without the TPEC, and simply with either a plasticizer or a polyolefin. In embodiments, a thermoplastic polymer composition comprising the SiHSBC and based on 100 parts by weight of the SiHSBC, 0-150 parts of a polyolefin, 30-300 parts of a plasticizer, and 0-50 parts of at least an additive. In embodiments, a thermoplastic polymer composition comprising the SiHSBC and based on 100 parts by weight of the SiHSBC, 10-150 parts of a polyolefin, 0-300 parts of a plasticizer, and 0-50 parts of at least an additive.

The polyolefin can be selected from but not limited to the group of polypropylene, polyethylene, high density polyethylene (HDPE), low density polyolefin (LDPE), linear low density polyethylene (LLDPE), ultra high molecular weight polyethylene (UHMW-PE), linear low-density polyethylene (LLDPE), very low-density polyethylene (VLDPE), copolymer of ethylene and α-olefins comprising $C_3$-$C_{20}$ comonomer, such as 1-butene, 1-hexene, 4-methyl-1-pentene, 1-octene, 1-decene, 1-dodecene, 1-tetradecene, 1-hexadecene, 1-octadecene, ethylene-propylene copolymer, such as random polypropylene or block polypropylene, and mixtures thereof.

In embodiments, the thermoplastic polymer composition further comprises other polymers, e.g., acrylonitrile-butadiene-styrene, polylactic acid, polyamide, polyphenylsulfone, polycarbonate, polyethylene/acrylonitrile-butadiene-styrene, polycarbonate/acrylonitrile-butadiene-styrene, methylmethacrylate/acrylonitrile-butadiene-styrene, polyetherimide, ethylene-vinyl alcohol copolymers, polyester, poly (vinylidene chloride), polyphenylene ether, cellulose, polyacrylates, polymethacrylates, polystyrene, and mixtures thereof.

Exemplary additives include activators, curing agents, stabilizers, neutralizing agents, thickeners, coalescing agents, slip agents, release agents, antimicrobial agents, surfactants, antioxidants, antiozonants, color change pH indicators, plasticizers, tackifiers, film forming additives, dyes, pigments, cross-linking agents, UV absorbers, UV stabilizers, catalysts, fillers, other resins, redox couples, fibers, flame retardants, viscosity modifiers, wetting agents, deaerators, toughening agents, adhesion promoters, colorants, heat stabilizers, light stabilizers, lubricants, flow modifiers, drip retardants, antiblocking agents, antistatic agents, processing aids, stress-relief additives, wax, and mixtures thereof.

Plasticizers can be selected from the group of vegetable oils, process oils, mineral oils, phthalates, and mixture thereof. Process oils can include one or more components of the group consisting of paraffinic oils, naphthenic oils. In embodiments, paraffinic oils are saturated carbon backbones, naphthenic oils have polyunsaturated carbon structure or cyclic structures with little aromatic content.

Wax can be natural wax, petroleum derived wax, and mixtures thereof

Exemplary non-reactive fillers include $CaCO_3$, carbon black, graphite, and mixture thereof. Exemplary reactive fillers include silica, glass beads, sand, talc, mica, clays, wollastonite, $Mg(OH)_2$, $Al(OH)_3$, iron oxide, tin oxide, and mixture thereof. The reactive filler meaning here is the filler material reacting with the silane compound.

In embodiments, the thermoplastic polymer composition is prepared by devices known in the art, e.g., blender, mixer, kneader, roller, double screw extruder, or extruder.

In embodiments, the thermoplastic polymer composition is prepared by dry mixing the components of the composition. Alternatively, the thermoplastic polymer composition can be prepared by mixing components in a suitable solvent. The solvent can include organic solvents, e.g., cyclohexane, naphthas, toluene, ester solvents, such as ethyl acetate and propyl acetate, ketone solvents, such as methyl ethyl ketone, and methyl isobutyl ketone. The amount of the solvent can be from 100-2000 parts, based on the 100 parts of the SiHSBC.

Properties of Silane Functionalized Block Copolymer: The SiHSBC when processed (e.g., by heating, in solvent etc.), develops a desired adhesion to substrates. In embodiments, the substrate is selected from but not limited to the group of glass, silicium wafer, ceramic, metal, plastic, reinforcing fiber, wood, leather, masonry, concrete, rock, paper, cardboard, fabric, glass, brick, plaster, cement, tiles, mortar, and asphalt.

In embodiments, the SiHSBC adheres to a glass substrate without requiring a primer layer and maintains excellent adhesion to the glass substrate even after exposure to high-temperature/high-humidity conditions for a long period of time, e.g., 1 week, 1 month, 3 months, or more.

In embodiments, the SiHSBC has a tensile strength of >3, or >5, or >10, or <30 MPa, measured according to ISO37 by using type 2 dumbbells cut from 2 mm thick compression molded plates and tested at 23° C. using a 500 mm/min tensile speed.

In embodiments, the SiHSBC after cross-linking by exposure to hot water, has a tensile strength of >3, or >5, or >10, or <30 MPa.

In embodiments, the SiHSBC has a peel adhesion strength to glass substrates of >20, or >30, or >40, or >50, or >60, or <100 N/cm, measured according to ASTM F88, before and after aging specimens for 1 week in water at 23° C.

In embodiments, the SiHSBC has a Shore A hardness of 10-70, or 20-70, or 30-60, or >15, or >20, measured according to ASTMD2240.

In embodiments, the SiHSBC has a melt flow rate (MFR) at 190° C. with 2.16 kg load, of >1, or >3, or >5, or >15 dg/min, measured according to ASTM D1238.

In embodiments, the SiHSBC has a clarity of >70%, or >75%, or >80%, or >85%, measured on 1 mm plate.

In embodiments, the SiHSBC has a transparency of >70%, or >75%, or >80%, or >85% on 1 mm plate, measured according to ASTM D-1003.

In embodiments, the SiHSBC has a refractive index (RI) of 1.45-1.55, or 1.48-1.54, or 1.51-1.525.

Properties of Thermoplastic Polymer Composition: Thermoplastic polymer compositions containing the SiHSBC are characterized as having improved adhesion properties to various substrates. In embodiments, a thermoplastic polymer composition has a peel adhesion strength to the glass substrate of >10, or >20, or >30, or >40, >50, or <100 N/cm, measured according to ASTM F88, before and after aging specimens for 1 week in water at 23° C.

In embodiments, a thermoplastic polymer composition has a Shore hardness A of 10-80, or 15-70, <70, or <50, or >15, or >20, measured according to ASTM D2240.

In embodiments, a thermoplastic polymer composition has a melt flow rate (MFR) at 190° C. with 2.16 kg load, of >1, or >3, or >5, or >10, >15 dg/min, measured according to ASTM D1238.

In embodiments, a thermoplastic polymer composition after curing, provides a cured composition having a compression set at 120° C. or at 180° C. after 24 hrs. of <80%, or <70%, or >40%, or >50%.

End-Use Applications: The SiHSBC and thermoplastic polymer compositions thereof, can be used for forming articles, e.g., seals for use with window panes, windshields, etc. Other industrial applications of SiHSBCs and compositions thereof, include adhesives, sealants, primer, tie layer, encapsulating agents for windows, in wires and cables, as transparent rubbery layer for solar panels, for fiber coating, in flame retardant systems, high temperature resistant cured TPE, etc.

Examples: The following examples are provided to further illustrate the disclosure, with properties or measurement methods as indicated below.

Materials: The following materials are used.

BC1 is a selectively hydrogenated coupled block copolymer obtained from styrene and 1,3-butadiene monomers having a structure of $(S-E/B)_nX$ with 93% coupling efficiency, a $M_p$ of 75 kg/mol, a polystyrene content (PSC) of 20%, a RAMI of 29, a hydrogenation level of 99.2 mol %, a MFR of 38 dg/min at 190° C. and 2.16 kg load, an ODT of 200° C., hardness shore A of 52, and a solution viscosity of 90 mPa·s when measured at 25 wt. % in toluene at 25° C.

BC2 is a selectively hydrogenated block copolymer obtained from styrene and 1,3-butadiene monomers, having a structure of S-E/B-S, a $M_p$ of 235 kg/mol, a PSC of 31 wt. %, a RAMI of 26, a hydrogenation level of 99.2 mol %, a hardness Shore A of 60, and a solution viscosity >50 mPa·s when measured at 25 wt. % in toluene at 25° C.

BC3 is a selectively hydrogenated block copolymer having a structure of $(S-E/B)_nX$ with 92% coupling efficiency, a $M_p$ of 242 kg/mol, a PSC of 13 wt. %, a RAMI of 30, a MFR of 0.4 dg/min at 190° C. and 2.16 kg load, a hydrogenated level of 99 mol %, an ODT of 255° C., a hardness Shore A of 35, and a solution viscosity of 650 mPa·s when measured at 25 wt. % in toluene at 25° C.

BC4 is a selectively hydrogenated block copolymer obtained from styrene and 1,3-butadiene monomers, having a structure of S-E/B-S, a $M_p$ of 80 kg/mol, a PSC of 30 wt. %, a RAMI of 15, a MFR of 2 dg/min at 230° and 2.16 kg load, a hydrogenation level of 99.2 mol %, a hardness Shore A of 70, and a solution viscosity of 1800 mPa·s when measured at 25 wt. % in toluene at 25° C.

BC5 is a selectively hydrogenated block copolymer obtained from styrene and 1,3-butadiene monomers. It has a structure of S-E/B/S-S with a $M_p$ of 150 kg/mol, a PSC of 60 wt. %, a RAMI of 14, a hydrogenation level of 99.5 mol %, and a hardness Shore A of 79.

BC6 is a 2 wt. % maleic anhydride functionalized version of BC4.

BC7 is a selectively hydrogenated block copolymer obtained from styrene and 1,3-butadiene monomers having a structure of S-E/B-S, a $M_p$ 280 kg/mol, a PSC of 31 wt. %, a RAMI of 15, a level of hydrogenation of 99 mol %, a hardness Shore A of 70, and a solution viscosity above 50 mPa·s, measured at 25 wt. % in toluene at 25° C.

Kristalex™ 5140 is a hydrocarbon resin having a softening point of 140° C. from Eastman.

A silicate type glass plate is used as the substrate without any specific surface treatment and with dimensions as length (L)*width (W)*height (H)=135*25.4*3 mm.

Process of preparation of SiHSBC: SiHSBCs are produced by extruding BC1 to BC7, separately, with different silanes (VTMOS and VTEOS) and peroxide using a 30 mm corotating twin screw extruder. In the examples, components are added as parts per 100 of HSBC. The temperature profile in the extruder during functionalization, the amount of each of the silane and amounts of the peroxide are summarized in table 1.

TABLE 1

| SiHSBC | HSBC | Silane | Amount of silane | peroxide | Additive | Extruder maximum temp. (° C.) | Extruder die temp (° C.) | MFR (190° C./2.16) | Grafted silane (in wt. %) |
|---|---|---|---|---|---|---|---|---|---|
| SiHSBC1 | BC1 | VTMOS | 10 | 0.6 | — | 180 | 140 | 132 | 3.7 |
| SiHSBC2 | BC1 | VTEOS | 5 | 0.6 | — | 180 | 140 | 68 | 4.1 |
| SiHSBC3 | BC1 | VTMOS | 3.2 | 0.6 | 1 ZnO | 180 | 140 | 84 | — |
| SiHSBC4 | BC1 | VTMOS | 8 | 0.6 | — | 180 | 140 | 101 | 6 |
| SiHSBC5 | BC1 | VTEOS | 3 | 0.6 | — | 180 | 140 | 61 | 2.4 |
| SiHSBC6 | BC1 | VTMOS | 2 | 0.2 | — | 180 | 160 | 52 | 1.3 |
| SiHSBC7 | BC1 | VTMOS | 5 | 0.2 | — | 180 | 160 | 62 | 2.2 |
| SiHSBC8 | BC1 | VTMOS | 5 | 0.4 | — | 180 | 160 | 78 | 3 |
| SiHSBC9 | BC1 | VTMOS | 1.5 | 0.6 | — | 180 | 140 | 71 | 1.3 |
| SiHSBC10 | BC1 | VTMOS | 3.2 | 0.6 | — | 180 | 140 | 93 | 2.1 |
| SiHSBC11 | BC1 | VTEOS | 3 | 0.6 | 0.3 silica | 180 | 140 | 85 | — |
| SiHSBC12 | BC2 | VTMOS | 3 | 0.6 | — | 230 | 140 | <1 | — |
| SiHSBC13 | BC2 | VTMOS | 5 | 0.6 | — | 230 | 140 | <1 | — |
| SiHSBC14 | BC3 | VTMOS | 3 | 0.6 | — | 200 | 190 | 18 | — |
| SiHSBC15 | BC4 | VTEOS | 3 | 0.6 | — | 200 | 200 | 0.8 (230° C./2.16) | — |

Properties of HSBC and SiHSBC are presented in Table 2.

TABLE 2

| HSBC | RAMI | MFR (190° C./2.16 kg) | MFR (230° C./2.16 kg) | SiHSBC | MFR (190° C./2.16 kg) | MFR (230° C./2.16 kg) |
|---|---|---|---|---|---|---|
| BC1 | 29 | 38 | — | SiHSBC2 | 68 | — |
| BC1 | 29 | 38 | — | SiHSBC7 | 62 | — |
| BC1 | 29 | 38 | — | SiHSBC8 | 78 | — |
| BC2 | 26 | — | <1 | SiHSBC5 | 61 | — |
| BC3 | 30 | 0.4 | — | SiHSBC13 | — | <1 |
| BC4 | 15 | — | 2 | SiHSBC14 | 18 | — |
| | | | | SiHSBC15 | — | 0.8 |

The effect of storage duration on the MFR (190° C./2.16 kg) was evaluated for various SiHSBCs. Samples were dried and stored inside aluminum foil bag for different durations at 85° C. MFR results are provided in Table 3.

TABLE 3

| SiHSBC storage duration | MFR (190° C./2.16 kg) | | | | |
|---|---|---|---|---|---|
| | SiHSBC9 | SiHSBC10 | SiHSBC1 | SiHSBC3 | SiHSBC2 |
| 0 days | 71 | 93 | 132 | 84 | 68 |
| 2 days | 68 | 87 | 117 | 82 | 66 |
| 7 days | 58 | 73 | 81 | 75 | 61 |
| 21 days | 91 | 79 | 86 | 93 | 64 |
| 40 days | 58 | 84 | 65 | 78 | 50 |
| 15 months in dry condition at room temperature | 65 | 87 | — | — | — |

Measurements of MFR (230° C./2.16 kg) of SiHSBCs with respect to the storage duration in molten state were conducted to study the flowability, as shown in Table 4.

TABLE 4

| SiHSBC storage duration | SiHSBC4 MFR (230° C./2.16 kg) | SiHSBC5 MFR (230° C./2.16 kg) |
|---|---|---|
| 5 min at 230° C. | 690 | 442 |
| 10 min at 230° C. | 663 | 437 |
| 20 min at 230° C. | 623 | 400 |
| 30 min at 230° C. | 600 | 400 |
| 40 min at 230° C. | 600 | 400 |

HSBC and SiHSBC samples were exposed to water at 80° C. for 12 hours. Properties of samples were measured and reported in Table 5, with and without exposure to water.

TABLE 5

|  | BC1 | SiHSBC6 | SiHSBC7 | SiHSBC8 | SiHSBC12 |
|---|---|---|---|---|---|
| Before immersion in water | | | | | |
| MFR (190° C./2.16 kg) (dg/min) | 44 | 52 | 62 | 78 | <1 |
| Shore A Hardness (10 s) | 60 | 56 | 54 | 53 | 48 |
| Tensile strength (MPa) | 9.1 | 5.9 | 6.6 | 5.5 | 3 |
| Elongation at break (%) | 620 | 660 | 750 | 350 | 334 |
| Tear Strength (N/mm) | 42 | 29 | 30 | 29 | 20 |
| Compression set (24 h, 120° C.) (%) | — | — | — | — | 100 |
| Compression set (24 h, 180° C.) (%) | — | — | — | — | 100 |
| After immersion in water for 12 h at 80° C. | | | | | |
| MFR (190° C./2.16 kg) (dg/min) | 43 | <1 | <1 | <1 | <1 |
| Shore A Hardness (10 s) | 61 | 63 | 65 | 66 | 69 |
| Tensile strength (MPa) | 6.4 | 6 | 6.6 | 4.7 | 6.1 |
| Elongation at break (%) | 520 | 560 | 560 | 430 | 146 |
| Tear Strength (N/mm) | 28 | 35 | 38 | 34 | 34 |
| Compression set (24 h, 120° C.) (%) | — | — | — | — | 60 |
| Compression set (24 h, 180° C.) (%) | — | — | — | — | 55 |

Peel adhesion tests were conducted for SiHSBC on a glass substrate by compression molding 2 mm plate of the SiHSBC on the glass substrate at 180° C. for 5 min. Results are shown in Table 6.

TABLE 6

|  | BC1 | SiHSBC9 | SiHSBC10 | SiHSBC5 |
|---|---|---|---|---|
| MFR (before plate pressing) (190° C./2.16) | 30 | 80 | 89 | 61 |
| SiHSBC on glass substrate after 1 day | | | | |
| Peel adhesion to Glass (N/cm) | 0.6 | >40 | >40 | 34 |
| Failure type | Adhesive | Cohesive | Cohesive | Adhesive |
| MFR (after plate pressing) (190° C./2.16) | 31 | 62 | 73 | 55 |

Comparison of peel adhesion performance of the HSBC, SiHSBC, and the maleic anhydride functionalized HSBC is shown in Table 7. 2 mm plate of each sample is compression molded onto a glass substrate.

TABLE 7

|  | BC2 | SiHSBC13 | BC6 |
|---|---|---|---|
| Bound maleic anhydride onto the HSBC (% w) | — | — | 1.7 |
| Injection temperature (° C.) | 240 | 240 | 240 |
| Mould temperature (° C.) | 70 | 70 | 70 |
| Plate thickness of samples (mm) | 5 | 5 | 5 |
| After 1 day | | | |
| Peel adhesion to glass (N/cm) | 0.3 | >60 | 2 |
| Failure type | Adhesive | Cohesive | Adhesive |

The SiHSBC was mixed with toluene at 10 wt. % concentration to obtain a primer. The obtained primer was applied onto a glass substrate to study the peel adhesion and the transparency of the primer on the glass substrate, as presented Table 8.

TABLE 8

|  | Primer SiHSBC14 | Primer SiHSBC11 | Glass (without primer) |
|---|---|---|---|
| Primer application onto glass | Yes | Yes | No |
| Glass (with primer) transparency (%) | 91 | 91 | 90.4 |
| Glass (with primer) clarity (%) | 89.8 | 98.4 | 99.6 |
| Preheat the glass (with primer) at 70° C. and then overmolding BC2 at 250° C., cool down to RT | Yes | Yes | Yes |
| Peel adhesion (before water immersion) (N/cm) | NA | 6.6 | 6.8 |
| Peel adhesion after water immersion (at 70° C. for 2 hours) (N/cm) | 49.5 | 23.8 | 4.6 |

Thermoplastic polymer compositions were prepared by dry blending the SiHSBC with a thermoplastic elastomer compound (TPEC). 2 mm plates of thermoplastic polymer compositions were obtained at a temperature between 180° C. to 230° C. These plates were compression molded onto a glass substrate at 200° C. for 5 mi and peel adhesion strength was measured, details are provided in Table 9.

TABLE 9

|  | Comp-1 | Comp-2 | Comp-3 | Comp-4 |
|---|---|---|---|---|
| SiHCBC4 | 100 | 50 | 15 | 0 |
| TPEC (100 parts of BC7 + 100 parts of mineral white oil + 34 parts of polypropylene, based on 100 of BC7) | 0 | 50 | 85 | 100 |
| Peel adhesion (after 1 day at room temperature) (N/cm) | 21 | 31 | 7 | No adhesion |
| Immersion for 7 days in water | | | | |
| Peel adhesion (after water immersion) (N/cm) | 39 | 26 | 6 | — |
| Failure type | Cohesive | Cohesive | Adhesive | — |

The peel adhesion performance of the thermoplastic polymer composition was evaluated on various substrates, as shown in Table 10. The mold was pre-heated at 70° C. and the thermoplastic polymer composition was directly injection overmolded on to the respective substrate at 240° C. The substrate with the composition was stored at room temperature for 1 day before measuring the peel adhesion strength.

TABLE 10

|  | Comp-5 | Comp-6 | Comp-7 |
|---|---|---|---|
| SiHSBC13 | 100 | 29.5 | — |
| BC5 | — | 29.5 | 59 |
| Mineral white oil | — | 30 | 30 |
| Kristalex ™ 5140 | — | 11 | 11 |
| Peel adhesion on Glass (N/cm) | 58 | — | — |
| Peel adhesion on polyoxymethylene (POM) (N/cm) | 5 | 25 | 7 |
| Peel adhesion on iron (N/cm) | 56 | — | — |
| Peel adhesion on Aluminum (N/cm) | 39 | — | — |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A silane functionalized block copolymer comprising:
   (a) 80 to 99.90 wt. % of a hydrogenated styrenic block copolymer; and
   (b) 0.1 to 20 wt. % of a silane, based on the total weight of the silane functionalized block copolymer,
   wherein the silane has a general formula (I):

$$RR'_n SiX_{3-n} \qquad (I)$$

wherein R is an alkene or an alkyne group, R' is a H or an alkane group, X is an alkoxy group, and n=0, 1, or 2;
   wherein the hydrogenated styrenic block copolymer is obtained by hydrogenation of a styrenic block copolymer comprising at least one polymer block A derived from a vinyl aromatic monomer, and at least one polymer block B derived from a conjugated diene monomer;
   wherein the polymer block B has:
      a hydrogenation level of greater than 95 mol %, based on the total mol of the polymerized conjugated diene monomer in the polymer block B; and
      an amount of polymerized 1,3-butadiene monomer of greater than 80 wt. %, based on the total weight of the polymerized conjugated diene monomer in the polymer block B;
   wherein the hydrogenated styrenic block copolymer has:
      a molecular weight $M_p$ of 40 to 500 kg/mol;
      a rubbery aliphatic methyl index of 18 to 38; and
      a polystyrene content of 8 to 45 wt. %, based on the total weight of the hydrogenated styrenic block copolymer;
   wherein the silane functionalized block copolymer has: a peel adhesion strength to glass substrate of greater than 20 N/cm, measured according to ASTM F88, and
   a melt flow rate, at 190° C. with 2.16 kg load, of greater than 15 dg/min, measured according to ASTM D1238.

2. The silane functionalized block copolymer of claim 1, wherein the hydrogenated styrenic block copolymer has an order-disorder-transition temperature of less than 300° C.

3. The silane functionalized block copolymer of claim 1, wherein the hydrogenated styrenic block copolymer has a solution viscosity at 25 wt. % in toluene at 25° C. of less than or equal to 1800 mPa·s.

4. The silane functionalized block copolymer of claim 1, wherein the polymer block A has a molecular weight $M_p$ of 3 to 45 kg/mol, and the polymer block B has a molecular weight of $M_p$ of 5 to 400 kg/mol.

5. The silane functionalized block copolymer of claim 1, wherein the silane functionalized block copolymer has a refractive index of 1.45 to 1.55.

6. The silane functionalized block copolymer of claim 1, wherein the vinyl aromatic monomer is selected from the group of styrene, alpha-methylstyrene, methyl styrene, para-methylstyrene, ethyl styrene, propyl styrene, butyl styrene, tert-butyl styrene, dimethyl styrene, halogenated styrene, methoxy styrene, acetoxy styrene, vinyl toluene, isomers of vinyl toluene, vinyl xylene, 1,1 vinyl biphenyl, vinyl naphthalene, vinyl anthracene, and mixture thereof.

7. The silane functionalized block copolymer of claim 1, wherein any additional conjugated diene monomer is selected from the group of isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof.

8. The silane functionalized block copolymer of claim 1, wherein the silane functionalized block copolymer comprises 0.1 to 10 wt. % of silane grafted onto the hydrogenated styrenic block copolymer.

9. The silane functionalized block copolymer of claim 1, wherein the polymer block A has a hydrogenation level of less than 30 mol %, and the polymer block B has a hydrogenation level of greater than 70 mol %, based on the total mol of the hydrogenated styrenic block copolymer.

10. The silane functionalized block copolymer of claim 1, wherein the styrenic block copolymer has a structure selected from the group of A-B, A-B-A, (A-B)$_n$X, (A-B-B')$_n$X, and mixtures thereof,
wherein A is a polystyrene block; B and B' are same or different and are selected from the group of polybutadiene, poly(isoprene-r-butadiene), and poly(butadiene-r-styrene); n is a positive integer; and X is residue of a coupling agent.

11. The silane functionalized block copolymer of claim 1, wherein the silane is selected from the group of vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, vinyltriacetoxysilane; methacryloxypropyltrimethoxysilane, methacryloxypropyltriethoxysilane, dimethoxymethylsilane, diethoxymethylvinylsilane, p-styryltrimethoxysilane, p-styryltriethoxysilane and mixture thereof.

12. The silane functionalized block copolymer of claim 1, wherein the silane functionalized block copolymer has a molecular weight ($M_p$) of 45 to 250 Kg/mol.

13. A thermoplastic polymer composition comprising:
5 to 95 parts by weight of the silane functionalized block copolymer of claim 1; and
5 to 95 parts by weight of a thermoplastic elastomer compound, based on the total weight of the thermoplastic polymer composition.

14. The thermoplastic polymer composition of claim 13, wherein the thermoplastic elastomer compound comprises: 100 parts of one or more thermoplastic elastomer, 50-250 parts of a plasticizer, and 0-50 parts of at least an additive; wherein the thermoplastic elastomer is selected from the group consisting of polyolefins, hydrogenated styrenic block copolymers, styrenic block copolymer, thermoplastic copolyester or copolyester-ether, thermoplastic vulcanizates, thermoplastic polyurethanes, and mixtures thereof.

15. A thermoplastic polymer composition comprising:
100 parts by weight of the silane functionalized block copolymer of claim 1;
0 to 150 parts of a polyolefin;
30 to 300 parts of a plasticizer; and
0 to 50 parts of at least an additives.

16. The thermoplastic polymer composition of claim 15, wherein the plasticizer is selected from the group consisting of vegetable oils, process oils, mineral oils, phthalates, and mixtures thereof.

17. A thermoplastic polymer composition comprising:
100 parts by weight of the silane functionalized block copolymer of claim 1;
10 to 150 parts of a polyolefin;
0 to 300 parts of a plasticizer; and
0 to 50 parts of at least an additives.

18. The thermoplastic polymer composition of claim 17, wherein the polyolefin is selected from a polypropylene, an ethylene-propylene copolymer, a high density polyethylene (HDPE), a low density polyolefin (LDPE), a linear low density polyethylene (LLDPE), an ultra high molecular weight polyethylene (UHMW-PE), a very low-density polyethylene (VLDPE), and mixture thereof.

* * * * *